US008700515B2

(12) United States Patent
Duckworth et al.

(10) Patent No.: US 8,700,515 B2
(45) Date of Patent: Apr. 15, 2014

(54) SECURITY-TO-ENTITY CROSSWALK

(75) Inventors: Alan L. Duckworth, Wescosville, PA (US); William A. Fritz, Schnecksville, PA (US); Craig Albert, Bethlehem, PA (US); Jeffery F. Brill, Schnecksville, PA (US); Richard A. Fersch, Verona, NJ (US); Vicki P. Raeburn, Pelham, NY (US); Sandra Stoker, Allentown, PA (US); Scott J. Preiss, Marlboro, NJ (US); Maria Madeline Latorraca, Brooklyn, NY (US); James D. Taylor, East Northport, NY (US); Barry Scott Raskin, Easton, CT (US); Sara Banerjee, Stamford, CT (US)

(73) Assignees: Dun & Bradstreet, Inc., Short Hills, NJ (US); Standard & Poor's, New York, NY (US); Telekurs, Inc., Stamford, CT (US)

( * ) Notice: Subject to any disclaimer, the term of this patent is extended or adjusted under 35 U.S.C. 154(b) by 173 days.

(21) Appl. No.: 10/862,247

(22) Filed: Jun. 7, 2004

(65) Prior Publication Data

US 2005/0010513 A1 Jan. 13, 2005

Related U.S. Application Data

(60) Provisional application No. 60/478,517, filed on Jun. 13, 2003.

(51) Int. Cl.
*G06Q 40/00* (2012.01)

(52) U.S. Cl.
USPC .......................................... 705/36 R; 705/35

(58) Field of Classification Search
USPC .................................................. 705/35–37
See application file for complete search history.

(56) References Cited

U.S. PATENT DOCUMENTS

| | | | | |
|---|---|---|---|---|
| 5,893,079 | A * | 4/1999 | Cwenar | 705/36 R |
| 6,026,381 | A * | 2/2000 | Barton et al. | 705/35 |
| 6,249,770 | B1 | 6/2001 | Erwin et al. | |
| 7,801,808 | B1 * | 9/2010 | Mattison et al. | 705/38 |
| 2001/0021922 | A1 * | 9/2001 | Curtis et al. | 705/35 |
| 2001/0056391 | A1 | 12/2001 | Schultz | |
| 2002/0178102 | A1 * | 11/2002 | Scheinberg et al. | 705/37 |
| 2003/0140058 | A1 * | 7/2003 | Martin et al. | 707/103 R |
| 2003/0212621 | A1 * | 11/2003 | Poulter et al. | 705/36 |
| 2005/0050555 | A1 * | 3/2005 | Exley et al. | 719/328 |

OTHER PUBLICATIONS

Business/Technology Editors. (May 23, 2000). "Dun & Bradstreet Introduces D&B Family Tree Finder; Web-Based Tool Identifies Business Relationships To Manage Client Conflicts". Business Wire, 1, from Business Dateline. (Document ID: 54048086).*

(Continued)

*Primary Examiner* — Hani M Kazimi
*Assistant Examiner* — Abhishek Vyas
(74) *Attorney, Agent, or Firm* — Ohlandt, Greeley, Ruggiero & Perle LLP

(57) ABSTRACT

A security-to-entity crosswalk system and method link business entity information to financial security information to provide risk insight about the business entity associated with a given security. The system comprises a collection of financial securities data, a collection of business entity data, and an integration component. The integration component links the collection of financial securities data with the collection of business entity data into a collection of master data. A business entity identifier is appended to an issuing entity in a collection of data. The business entity identifier is linked to a financial security identifier in the collection of data. Business information associated with said issuing entity is provided.

2 Claims, 3 Drawing Sheets

(56) References Cited

OTHER PUBLICATIONS

Business/Technology Editors. (May 23, 2000). "Dun & Bradstreet Introduces D&B Family Tree Finder; Web-Based Tool Identifies Business Relationships to Manage Client Conflicts". Business Wire, 1, from Business Dateline. (Document ID: 5408086).*

Office Action dated Nov. 23, 2011 corresponding to Taiwan Patent Application No. 93116881.

* cited by examiner

SECURITY-TO-ENTITY CROSSWALK

CROSS-REFERENCED APPLICATION

This application is claiming priority of U.S. Provisional Patent Application No. 60/478,517, filed on Jun. 13, 2003, which is incorporated herein in its entirety.

BACKGROUND

1. Field of the Invention

The present invention generally relates to linking business entity information to financial securities information. In particular, it relates to linking and maintaining multiple business entity and financial securities databases.

2. Description of the Related Art

Financial service companies are building information warehouses for marketing and risk administration applications. These activities are required in order to provide the required insight and underlying business processes to address global regulatory and governance requirements. The information in these warehouses is typically organized around an internal code or financial instrument identifier. The data associated with the instrument or security describes the security, but contains limited information about the company that issued the security. Often, financial service companies will attempt to link their internal data or business entity data to the financial instrument data via manual processes to gain additional risk insight about the entity the security relates to. The present invention will eliminate this manual step and improve customer efficiency.

SUMMARY OF THE INVENTION

A system for a security-to-entity crosswalk is one embodiment of the present invention. The system comprises a collection of financial securities data, a collection of business entity data, and an integration component. The integration component links the collection of financial securities data with the collection of business entity data into a collection of master data. An access component accesses the collection of master data, a management component manages the collection of master data, and an update component updates the collection of master data. The collection of financial securities data comprises at least two collections of data. A linkage maintenance component updates linkage in the collection of master data. A unique numbering system is associated with the collection of master data. The collection of master data comprises a security-to-entity master file. The security-to-entity master file comprises a number of instruments linked to a number of issuer entities, a number of corresponding business entity identifiers, and corporate family tree linkage information. The security-to-entity master file comprises a database of security identifiers that cross-references issues.

A method for a security-to-entity crosswalk is another embodiment of the present invention. A business entity identifier is appended to an issuing entity in a collection of data. The business entity identifier is linked to a financial security identifier in the collection of data. Business information associated with said issuing entity is provided. The business entity identifier is appended to the issuing entity at a site level. The business information includes corporate structure, corporate family tree linkage, standardized names and addresses, corporate activity, and changes to corporate structure. The business entity identifier is provided on securities. Changes are detected in the collection of data and the data is updated and maintained periodically. The business entity identifier is matched to the issuing entity. A selection of the business information associated with the issuing entity in the collection of data is appended. A computer-readable medium has computer-executable instructions for performing this method for a security-to-entity crosswalk.

These and other features, aspects, and advantages of the present invention will become better understood with reference to the following drawings, description, and appended claims.

DETAILED DESCRIPTION OF THE PREFERRED EMBODIMENTS

In the following detailed description, reference is made to the accompanying drawings. These drawings form a part of this specification and show, by way of example, specific preferred embodiments in which the present invention may be practiced. These embodiments are described in sufficient detail to enable skilled artisans to practice the present invention. Other embodiments may be used. Structural, logical, and electrical changes may be made without departing from the spirit and scope of the present invention. Therefore, the following detailed description is not to be taken in a limiting sense and the scope of the present invention is defined only by the appended claims.

Figure 1:
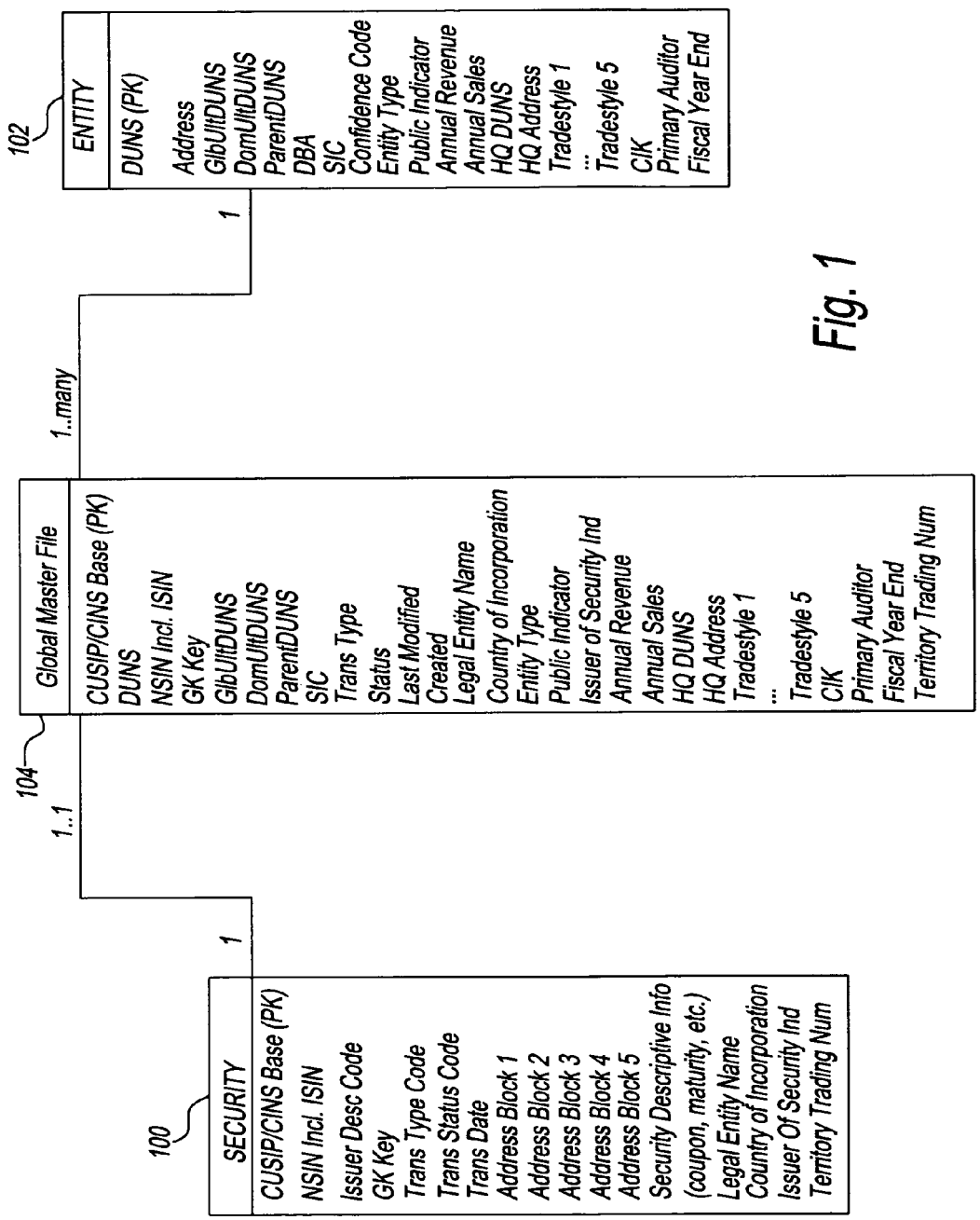
FIG. 1 is a block diagram of example databases and linkage according to the present invention.

FIG. 1 shows example databases and linkage according to the present invention. In this example, a financial security table 100 is linked to a business entity table 102 by a global master file 104. There is a one-to-one relationship between financial security table 100 and global master file 104 and a one-to-many relationship between global master file 104 and business entity table 102. The primary key (PK) of financial security table 100 is a financial security identifier.

Financial security identifiers include Committee on Uniform Securities Identification Procedures (CUSIP) numbers and International CUSIP (CINS) codes and any other kind of security identifiers. CUSIP supplies a unique nine-character identification, called a CUSIP number, for each class of security approved for trading in the U.S. to facilitate clearing and settlement. The CUSIP uniquely identifies issuers and issues of securities and financial instruments within a standard framework. The CUSIP number consists of nine characters: a base number of six digits known as the issuer number, the 4th, 5th and/or 6th digit of which may be alpha or numeric, and a two charter suffix (either numeric, or alpha or both) known as the issue number, The ninth character is a check digit. The first portion of a CINS code is always represented by an alpha character signifying the Issuer's country geographic region.

ISIDPlus, which is available from Standard & Poor's, New York, N.Y., and Telekurs USA, Stamford, Conn., is the world's most comprehensive database of security identifiers, cross-referencing over 650,000 issues to assist in automating trading, clearing, and settlement activities for global straight-through processing. ISIDPlus is the largest repository of securities identification numbers worldwide. Securities covered include equity and debt instruments issued by over 180 countries. ISIDPlus is a comprehensive database of security identifiers cross-referencing issues from over 200 exchanges.

ISIDPlus is based on Telekurs' global securities database and Standard & Poor's US-based securities data, and covers most types of equity and debt instruments. Securities trading in two or more global markets are included in ISIDPlus. ISIDPlus has identifiers from all major numbering agencies including CUSIP/CINS, ISIN, Stock Exchange Daily Official List (SEDOL) and Valor.

Financial security table 100 is associated with a collection of financial security data. Some examples of financial security data are listed below.

CUSIP/CINS Base
    National Securities Identification Number (NSIN), including International Securities Identification Number (ISIN)
    Issuer Description Code
    Global identifier (GK Key)
    Transaction Type Code
    Transaction Status Code
    Transaction Date
    Addresses
    Security Descriptive Information (coupon, maturity, etc.)
    Legal Entity Name
    Country of Incorporation
    Issuer of Security Indicator
    Territory Trading Number The primary key (PK) of business entity table 102 is a business entity identifier. Business entity table 102 is associated with a collection of business information.

Business information includes the business information provided by Dun & Bradstreet, Short Hills, N.J., or any other kind of business information. Dun & Bradstreet's World Base file provides the linkage components for existing corporate entities (i.e., issuers) within in the ISIDPlus service. In terms of global entity coverage, D&B currently provides and maintains information on over 7.6 million linked commercial entities and almost 80 million total commercial entities worldwide.

Business entity identifiers include the D-U-N-S® Number or any other kind of identifiers. The D-U-N-S® Number is a nine-digit number that is uniquely assigned by Dun & Bradstreet to each business entity and is a widely accepted tool for identifying, organizing, and consolidating information about businesses. The D-U-N-S® Number is dynamically linked to headquarters, branches, parents, and subsidiaries on more than 1.6 million corporate families containing about 7.6 million members.

Some examples of business information are listed below.
    D-U-N-S® Number
    Address
    Global Ultimate D-U-N-S® Number
    Domestic Ultimate D-U-N-S® Number
    Parent D-U-N-S® Number
    Doing Business As (DBA)
    Standard Industrial Classification (SIC)
    Confidence Code
    Entity Type
    Public Indicator
    Annual Revenue
    Annual Sales
    Headquarters D-U-N-S® Number
    Headquarters Address
    Tradestyles
    Fiscal Year End Global master file 104 is associated with information linking financial security table 100 and business entity table 102. Some example data is listed below.

CUSIP/CINS Base
    D-U-N-S® Number
    NSIN, including ISIN
    GK Key
    Global Ultimate D-U-N-S® Number
    Domestic Ultimate D-U-N-S® Number
    Parent D-U-N-S® Number
    Standard Industrial Classification (SIC)
    Transaction Type Code
    Transaction Status Code
    Last Modified
    Created
    Legal Entity Name
    Country of Incorporation
    Entity Type
    Public Indicator
    Issuer of Security Indicator
    Annual Revenue
    Annual Sales
    Headquarters D-U-N-S® Number
    Headquarters Address
    Tradestyles
    Fiscal Year End Other data in various collections of data for the present invention are listed below.
    Issuer/Security Descriptions
    Coupon Rate
    Dated Date
    Maturity
    Country of Incorporation (ISO Domicile Code)
    ISO Currency
    Case D-U-N-S number
    Primary Name
    Trade Name
    Location data
    Primary and Secondary SIC Code
    Status (last modified and created flags)

However, various other data is contemplated by the present invention as well.

In one embodiment of the present invention, the D-U-N-S® Number is appended to an issuing entity at the site level whenever possible. A collection of data contains securities referenced to national and international numbering systems. With the link to the D-U-N-S® Number, users are able to leverage business and family tree information to understand the business structure of the entity behind the security. The D&B database, a global database of over 80 million businesses, corporate linkage information, detailed firmagraphic information, and industry data is used to supplement data in ISIDPlus to gain additional perspective.

Users use the business entity and global linkage information to get a complete picture of the corporate structure as a measure of risk dispersion within a portfolio of holdings, specifically to identify different securities related to the same company. Various embodiments of the present invention provide users with efficient, accurate and dynamic information to help assess the following exposures:
    Company risk—Understand complete global exposure;
    Industry risk—Evaluate overall industry exposure; and
    Country risk—Determining country-level exposure.

Linking the D-U-N-S® Number to the CUSIP and CINS provides the following benefits to the financial community:
    Access to D&B family tree linkage to "roll up" securities for risk assessments;
    Standardized names and addresses to enhance incomplete files;
    Simplify the process of generating regulatory reports;

Confirm corporate activity (mergers, spin-offs, etc.) with information from D&B to improve risk management; and Access to a source of business information that is rigorously maintained with changes to corporate structure, mergers and acquisition activity, etc.

The rapid expansion of the international securities business makes security identification across international borders a challenge. Various embodiments of the present invention helps a user to improve operational efficiency, while facilitating cross-border consistency. It aids users to:

Improve automation between front and back operations;
Understand a company's entire security structure on a global basis;
Reduce processing errors; and
Obtain accurate information at the issuer level.

Figure 2:
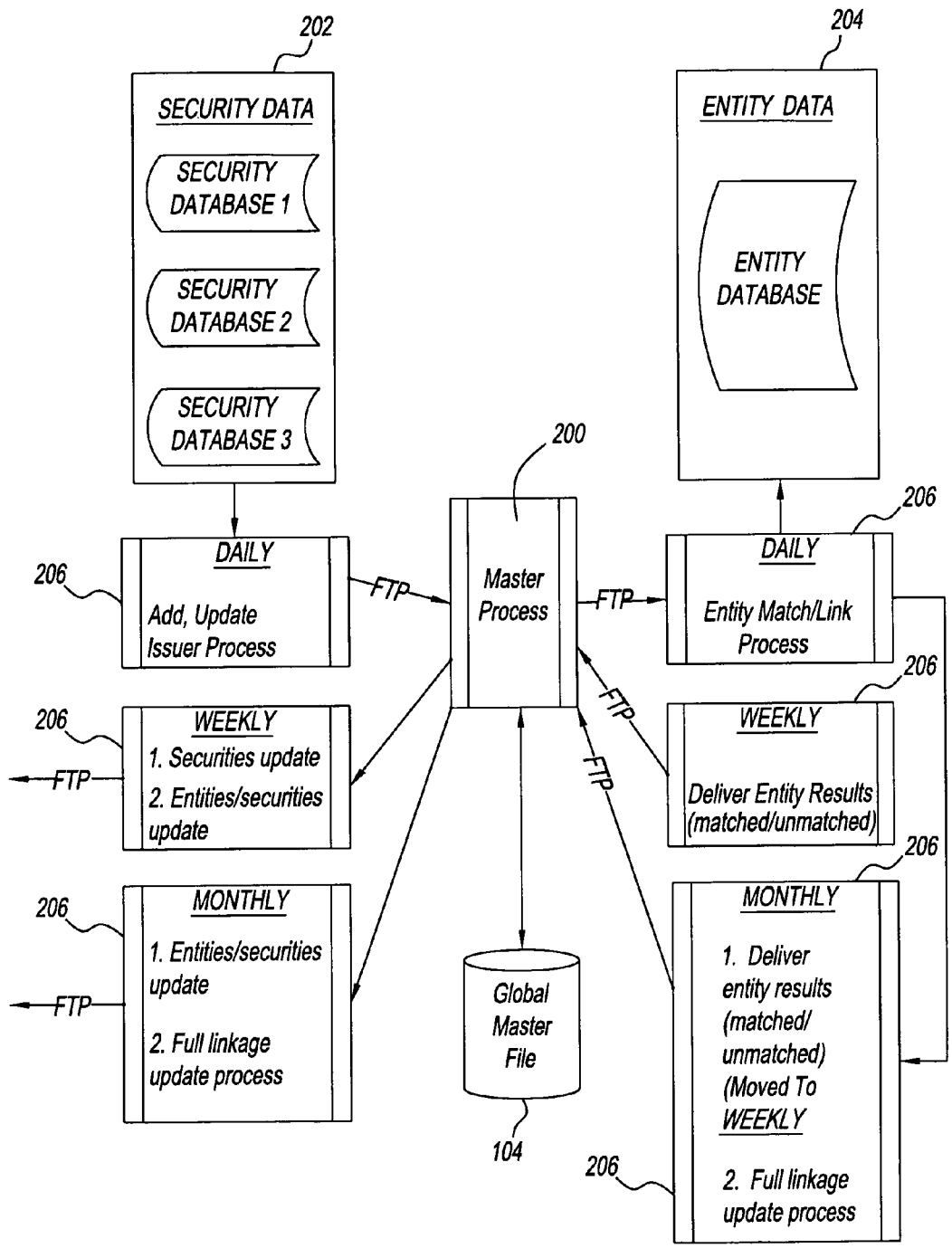
FIG. 2 is a block diagram of an example process of maintenance according to the present invention.

FIG. 2 shows an example process of maintenance according to the present invention. In this example, a master process 200 is in communication with global master file 104. Security data 202 and entity data 204 are effected by periodic processes 206, which are in communication with global master file 104.

In this example, global master file 104 comprises a cross-reference global database combined with master process 200 to facilitate the linking of business entity data 204 to security data 202.

An example embodiment of the present invention initially comprises a consolidated database of security data 202 and entity data 204. An initial security to entity master file has about 650,000 instruments, representing the ISIDPlus universe, is linked to the issuer entities (about 225,000 issuers) and the corresponding D-U-N-S® Number and the global family tree linkage information. The linked data products in this embodiment allow users to leverage business and family tree information to understand the business structure behind the issuers and their related securities. The D-U-N-S® Number is appended to each eligible issuer at the site level. In some instances, another D-U-N-S® Number in the corporate hierarchy is assigned. A D-U-N-S® number is provided on securities in accordance with D-U-N-S® Number policy.

The population of entities represented in this example embodiment are dynamic. Events such as mergers and acquisitions (M&A) are a regular occurrence. In addition, new businesses will enter the scene and others will exit. Monthly change detection and maintenance is provided. Global master file 104 is maintained, retaining the integrity of the data as a near mirror of the current marketplace. In this example, a daily feed from ISIDPlus comes in to D&B that highlights adds, changes and deletes.

Figure 3:
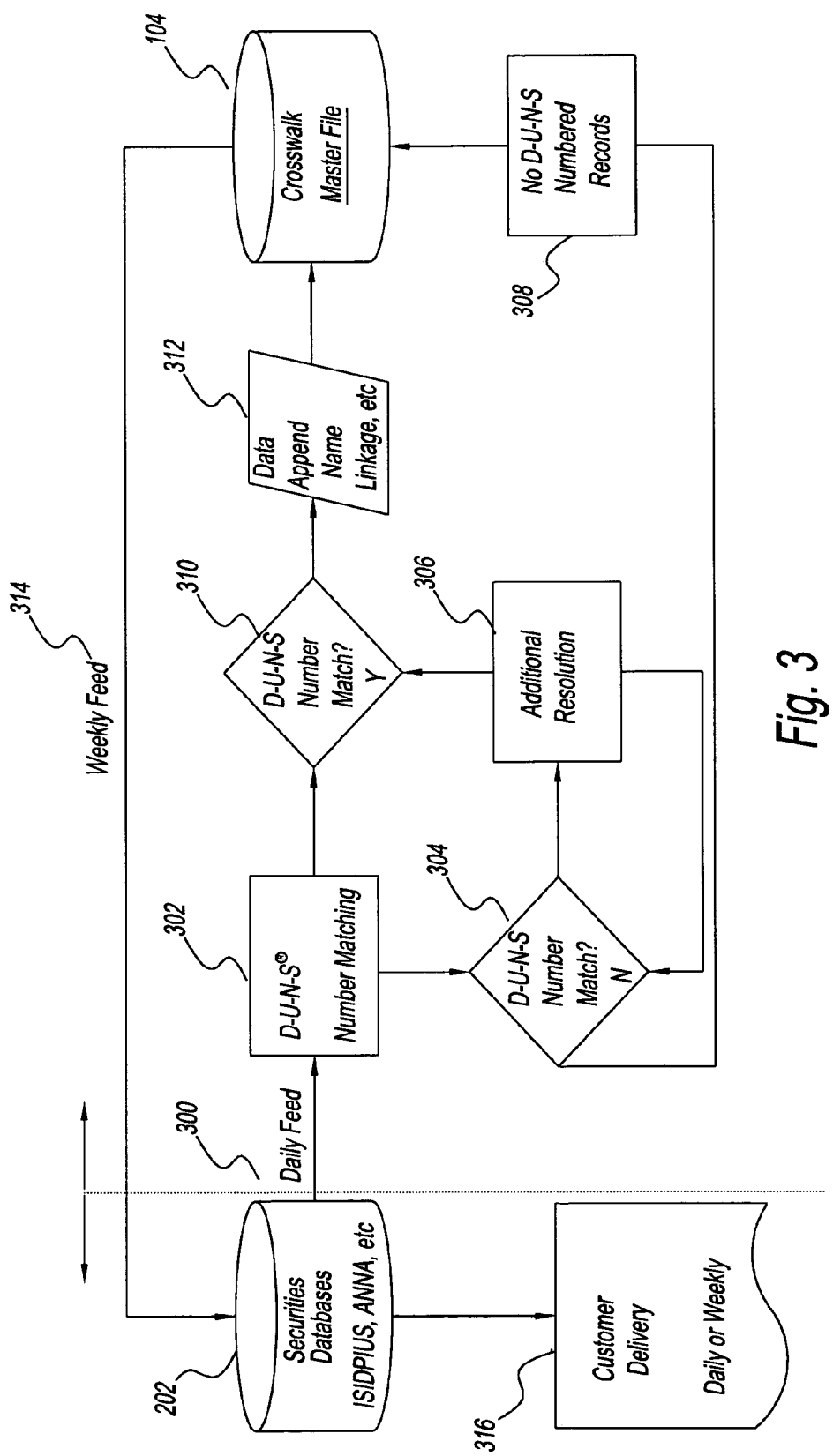
FIG. 3 is a block diagram of an example process of matching according to the present invention.

FIG. 3 shows an example process of matching according to the present invention. A daily feed 300 is input into a business entity identifier matching process 302. If there is no match 304, either an additional resolution 306 is made or records without business entity identifiers are handled 308. If there is a match 310, data is appended 312 and stored in global master file 104. Weekly feeds 314 are sent to security data 202 and may be delivered to customers 316.

In an example embodiment, a match is performed against a global universe of business records and appends the D-U-N-S® Number as well as selected data elements. The daily changes are aggregated and sent back to S&P on a weekly basis where the ISIDPlus file is updated with the refreshed data.

It is to be understood that the above description is intended to be illustrative and not restrictive. Many other embodiments will be apparent to those of skill in the art upon reviewing the above description, such as various organizations of data such as dispersing or replicated data among different points in a network. Various types of databases are contemplated by the present invention, such as relational or object-oriented type databases. Also, collections of data may be data marts, data warehouses, or other repositories of data. The present invention has applicability to fields outside business and financial fields, such as enterprise resource systems, mega exchange, specialist originator, e-speculator, solution provider, sell-side asset exchange and other business-to-business models. Therefore, the scope of the present invention should be determined with reference to the appended claims, along with the full scope of equivalents to which such claims are entitled.

What is claimed is:

1. A system, comprising:
   a first database that contains financial securities data comprising data relating to a financial instrument issued by a business entity, wherein said first database employs a financial security identifier as a key to access said financial securities data;
   a second database that contains business entity data comprising data relating to said business entity, wherein said second database employs an entity identifier uniquely assigned to said business entity as a key to access said business entity data;
   a master data file that contains corporate family tree linkage information for said business entity;
   and
   a computer that executes instructions, configured to:
   obtain said financial securities data from said first database;
   match said financial securities data to said business entity data in said second database;
   associate, from said match, a financial security identifier for said financial instrument with an entity identifier for said business entity, thus yielding a cross-reference between said data relating to said financial instrument and said data relating to said business entity;
   store said cross-reference in said master data file;
   utilize said cross-reference and said corporate family tree linkage information from said master data file to identify a corporate structure of said business entity and securities related to said business entity through said corporate structure; and
   assess risk of said business entity based on said securities related to said business entity through said corporate structure as a measure of risk dispersion.

2. A non-transitory computer-readable medium having computer-executable instructions for performing a method comprising:
   obtaining financial securities data from a first database, wherein said financial securities data comprises data relating to a financial instrument issued by a business entity, and wherein said first database employs a financial security identifier as a key to access said financial securities data;
   matching said financial securities data to business entity data in a second database, wherein said business entity data comprises data relating to said business entity, and wherein said second database employs an entity identifier uniquely assigned to said business entity as a key to access said business entity data;
   associating, from said match, a financial security identifier for said financial instrument with an entity identifier for said business entity, thus yielding a cross-reference between said data relating to said financial instrument and said data relating to said business entity;

storing said cross-reference in a master data file that contains corporate family tree linkage information for said business entity;
utilizing said cross-reference and said corporate family tree linkage information from said master data file to identify a corporate structure of said business entity and securities related to said business entity through said corporate structure; and
assessing risk of said business entity based on said securities related to said business entity through said corporate structure as a measure of risk dispersion.

* * * * *